J. M. PALMER.
TOOL DRIVING APPLIANCE.
APPLICATION FILED AUG. 8, 1907.
965,735.
Patented July 26, 1910.
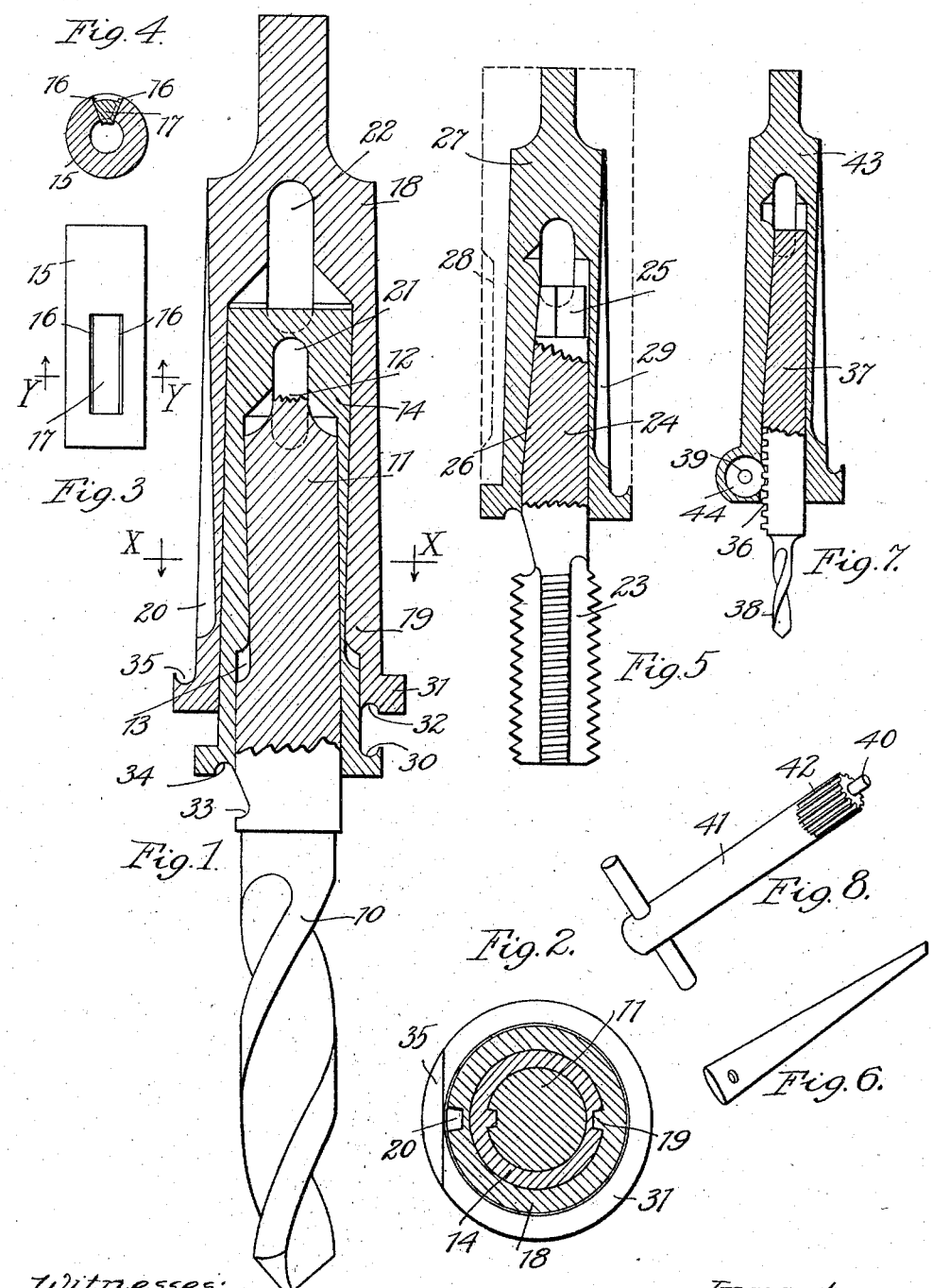
Witnesses:
Leonard W. Novander,
George C. Higham.
Inventor
John M. Palmer
By Charles A. Brown
Attorney

UNITED STATES PATENT OFFICE.

JOHN M. PALMER, OF CHICAGO, ILLINOIS, ASSIGNOR TO UNIVERSAL TOOL COMPANY, OF CHICAGO, ILLINOIS, A CORPORATION OF ILLINOIS.

TOOL-DRIVING APPLIANCE.

965,735. Specification of Letters Patent. Patented July 26, 1910.

Original application filed July 16, 1906, Serial No. 326,338. Divided and this application filed August 8, 1907. Serial No. 387,604.

*To all whom it may concern:*

Be it known that I, JOHN M. PALMER, citizen of the United States, residing at Chicago, in the county of Cook and State of Illinois, have invented a certain new and useful Improvement in Tool-Driving Appliances, of which the following is a full, clear, concise, and exact description, reference being had to the accompanying drawings, forming a part of this specification.

My invention relates to tool-holding and driving appliances, and contemplates a new system of interchangeable shanks and sockets for drills, taps and other rotating tools, and the spindles and other holding devices by which such tools are driven.

More particularly the present application is directed toward the means for separating tools from the driving sockets, or for separating the sockets from one another.

This invention is disclosed in my co-pending application Serial No. 326,338, filed July 16, 1906, but pursuant to the rules of the Patent Office relative to divisions, I am filing the present application as a division of the above-mentioned application in order that I may secure the grant of a patent containing claims directed more particularly to the improved means for separating devices of this character as disclosed in my co-pending application aforesaid.

At the present time it is the common practice to provide twist drills and other tools with a taper shank, the shanks being formed in accordance with a series of standard sizes and tapers. Lathe spindles and the spindles of drill presses and other machine tools are bored with a taper hole of some one of these standard sizes. A drill which is of large size may be provided with a taper shank which exactly fits the taper socket of the machine tool. A smaller drill will have a taper shank of smaller size, and in order to drive such a small drill by the spindle of the machine tool, it is necessary to insert a bushing or sleeve between the drill and the socket of the spindle of the machine tool. Sometimes it is necessary to insert a number of sleeves in order to drive a small tool by the spindle of a large machine tool. In order to remove such tools from their sleeves or sockets it is necessary to drive a tapered drift pin through an opening in the socket just above the end of the tang of the tool. When it is necessary to use a number of sleeves of increasing size in order to properly bush a tool for use in the spindle of a machine tool, it is necessary first to remove the sleeve of larger size, together with all those of smaller size, by driving the drift pin through the opening in the spindle of the machine tool, in order to get at the drill whose shank fits the sleeve of smallest size. It is then necessary to remove each of the sleeves of larger size in turn by driving a drift pin through the opening in each sleeve. Thus, when occasion requires that one small drill shall be replaced by another, it is necessary to remove all of the sleeves one by one, and then to replace them one by one upon the shank of the new drill.

One object of my present invention is to provide means for separating any two sockets or any socket from any tool of such a series without interfering with the engagement with one another of any other sockets of the series. Thus, for example, if two sockets or sleeves are required in order to bush a taper shank drill so that it will fit the spindle of a drill press, my invention provides means whereby the smaller socket may be withdrawn from the larger socket without removing the larger socket from the spindle of the drill press, and, in fact, without removing the smaller socket from the drill. It is possible, therefore, to remove the small drill with its socket and to insert a larger drill, which may have a shank of the same size as the outside of the smaller socket, without making any other changes than the one which is immediately required in order to carry out the work in hand.

In the preferred embodiment of my invention I provide each of the sockets with a flange at its larger end. The length of the sockets and the depth of the bore of each socket is made such that the flange of a smaller socket will not come into engagement with the flange of a larger socket into which the smaller is inserted. It is possible, therefore, to drive a wedge or drift pin of suitable form between the lower side of the larger flange and the upper side of the smaller flange, so that the two sockets may be separated from one another at their outside and exposed ends. In like manner my invention provides means whereby a tool, such as a twist drill, may be withdrawn from a taper driving socket without having access to the smaller end of the socket or the smaller end of the drill shank.

I prefer to incorporate this improved means of separating taper shank tools and sockets together with an improved form of driving means. It is, however, unnecessary to use these two improvements together, and the invention which is herein claimed may be used, if so desired, in connection with drills and driving sockets which are provided with the driving tangs now in common use.

The preferred embodiment of my invention, as also certain modifications thereof, and the advantages arising from the use of my improvements, will be made more readily apparent by reference to the accompanying drawings, in which—

Figure 1 illustrates in elevation a drill and a series of driving sleeves embodying my invention, part of this figure being in cross-section the more clearly to indicate the construction shown; Fig. 2 is a cross-sectional view taken on line $x$—$x$ of Fig. 1; Fig. 3 illustrates a preferred method of forming a driving sleeve; Fig. 4 is a cross-sectional view taken on line $y$—$y$ of Fig. 3; Fig. 5 is a view partly in elevation and partly in cross-section, showing the application of my invention to tools and sleeves employing the straight cylindrical system of shanks and sockets; Fig. 6 illustrates a drift pin adapted for use in conjunction with the system of my invention; Fig. 7 is a view illustrating a modification of the means provided for separating tools and sleeves, and Fig. 8 illustrates in perspective a pinion wrench intended for use in connection with this modified form of separating means.

In all of the figures similar characters of reference apply to corresponding parts.

In Fig. 1 I have shown a twist drill 10 having a taper shank 11. In this view the drill is shown as having its tang broken off at 12, and the driving of this drill is accomplished by means of the depressed key and keyway which constitute a feature of the tool-driving system with which I prefer to incorporate the separating means hereinafter claimed. A keyway is cut into the taper shank at 13, the depth of the keyway being increased from nothing at the small end of the taper shank to a maximum depth at the large end of the shank. I prefer to make the depth of the keyway increase at the same rate as the increase in the diameter of the taper shank itself. Thus it is that the bottom of the keyway is parallel with the element along the diametrically opposite side of the taper shank, as illustrated in Fig. 1. The keyway is preferably of more or less V-shaped cross-section, as best illustrated in Fig. 2. I prefer, however, not to bring the side of the keyway to a sharp angle at the bottom. The taper shank of the drill 10 is inserted within the socket of the sleeve 14, as illustrated in Fig. 1. This socket is, of course, tapered to fit the shank of the drill, and is provided with a depressed key or feather extending into the socket and registering with the keyway cut in the drill shank.

I prefer to form a driving sleeve in the following manner: A piece of stock 15 is bored with a taper hole corresponding with the taper shank of the tool which the sleeve is to fit. The stock is then slitted at 16, 16, these slits being cut, for example, in a milling machine converging toward the interior of the sleeve, as best indicated by the dotted lines in Fig. 4. A hardened and ground master shank, having formed within it the required keyway, is then inserted tightly within the taper hole of the stock, the keyway being brought into register with the piece of metal lying between the slits 16, 16. The cold stock is forced inwardly between the slits. The keyway in the master shank gives to the depressed key the proper size and shape, while the force applied from the exterior drives the metal strip 17 inwardly until it comes into contact with the outer sides of the slits, as best shown in Fig. 4. After the depressed key has thus been formed on the interior of a sleeve or spindle, the outside of the sleeve is turned or otherwise finished to bring the outside of the sleeve to the form of a taper shank of a larger size, the outside of this sleeve being adapted to fit into the socket of a larger sleeve or spindle. The finishing of the outside of the sleeve removes the metal down to the dotted lines in Fig. 3, and thus the finished sleeve has no depression upon its outer surface where the strip 17 has been depressed, and since the strip 17 is driven inwardly until it fits tightly against the outer sides of the slits 16, the sleeve may be finished on the outside to a smooth, unbroken surface, just as though the slitted strip had not been depressed to form the internal key or feather. After the depressed key has been formed on the inside of the sleeve, a suitable keyway may be milled or otherwise cut in the outside of the sleeve. The bottom of this keyway, as in the case of the drill, is preferably parallel with the element on the diametrically opposite side of the shank of the sleeve. This keyway, like that in the shank of the drill, does not extend quite to the smaller end of the taper shank of the sleeve. The keyway in the shank of the sleeve is preferably placed diametrically opposite the internally depressed key of the same sleeve.

Fig. 1 shows not only the sleeve 14 but a still larger sleeve 18, into which the smaller sleeve is fitted and which in turn will fit within a sleeve having a still larger socket or within the taper spindle of a drill press or other machine tool. This largest sleeve is provided with the depressed key at 19 and a properly formed keyway at 20. All of the keys and keyways are illustrated in cross-section in Fig. 2 The two sleeves shown in Fig. 1 are provided with the usual openings at 21 and 22 to accommodate the use of the ordinary drift in separating these sleeves from each other or the tools held within them. This feature, like the tangs, may or may not be provided, as desired. If the tangs are not provided, the keys and keyways are depended upon for driving the drill or other tool. To insert the drill 10 within the sleeve 14, the upper end of the drill is placed in the lower end of the sleeve and pressed upward, until the top of the drill comes into contact with the lower end of the depressed key. The drill is then turned by hand relative to the sleeve until the lower end of the depressed key registers with the upper end of the keyway cut in the drill shank. The drill can then be forced home, and during its movement into the sleeve the key is sunk deeper and deeper into the keyway, thus maintaining the alinement of the parts, and as the sides of the key make contact with the adjacent sides of the keyway the proper register of the parts is insured.

In Fig. 5 I have illustrated the application of my invention to a straight shank tool. In this figure I have illustrated a bottoming tap 23, this tap being provided with a straight cylindrical shank 24, the shank being milled down to a square head 25 for the use of a tap wrench when desired. I prefer to use the depressed key and keyway of my invention in connection with straight shank tools and sockets, and have therefore shown a keyway of V-shaped cross-section cut into the shank of the tap at 26, this keyway being increased in depth toward the top of the shank. The sleeve 27 is provided with a depressed key adapted to register with the keyway cut in the tool shank. This key may be formed in the manner previously described except that the master shank which is inserted in the sleeve should have the straight cylindrical contour with the tapering keyway, as illustrated in Fig. 5. The dotted lines in Fig. 5 illustrate the stock from which the sleeve 27 is cut, the dotted line 28 indicating the strip of metal which has been driven inwardly to form the depressed key. The outside of the sleeve 27 is provided with a keyway 29, like those shown in Fig. 1. The sleeve 27 can be fitted into the sleeve 14 in place of the drill shank 11. In this modification of my invention the key and keyway serve a double purpose, first, that of driving the drill and absolutely preventing it from slipping within the sleeve 27, and, second, that of holding the tool within the sleeve 27. Thus, for example, if the sleeve be inserted in the vertical spindle of a drill press, the tap can be forced up into the socket of the sleeve until the tool shank is wedged between the side of the socket and the converging bottom of the key. By raising the tap suddenly into position within the sleeve, it will hold itself and will not drop from the end of the spindle of the drill press, as it would if it were not for the converging key and keyway. The keyway cut in the straight shank of a tool does not interfere with the use of this tool in a chuck or in a sleeve or spindle having a set screw for clamping the tool. Nor do the keys and keyways of my invention interfere with the use of the ordinary tangs or square heads for tap wrenches and the like. The keyways required in the system of my invention can be milled in the shanks of drills, taps or other tools as now manufactured, thus simplifying the use of my invention in connection with tools of the prior art already in use.

While in Figs. 5 and 7 I have illustrated straight shank tools in the sockets of taper shank sleeves, it will be understood that the shanks of the sleeves may also be straight, while, if desired, their sockets may be tapered.

As previously stated, the invention herein claimed relates more particularly to means by which the sleeves and tools are separated from one another. It will be noted that each of the sleeves is provided at its larger end with a flange. In a tangential direction across the upper face of each flange a groove is cut, as at 30, to form a projecting ledge or lip on the sleeve 14 as shown in Fig. 1. On the lower side of the flange 31 of the sleeve 18 another groove is cut to form an overhanging lip. These two grooves are so placed relatively to the position of the associated keys and keyways that they will always come into position one above the other. By driving the drift pin shown in Fig. 6 into the space between the grooves 30 and 32 the sleeves 14 and 18 are forced apart. A groove 33 is milled through one side of the lower end of the shank of the drill 10, so that a drift pin can be driven into the space between the grooves 33 and 34 to force the drill from the sleeve 14. Upon the upper side of the flange 31 a groove 35 is cut, and a corresponding groove provided upon the next larger sleeve or spindle permits a drift pin to be used to withdraw the sleeve 18 from the sleeve or spindle in which it may be used. It is to be noted that by the use of these exposed flanges and grooves any two sleeves or tools or spindles may be separated without interfering in any way with the connection between the others which may have been used for bushing purposes. In carrying out the system of my invention, I have found it desirable to cut the upper groove on the same side of a shank as is the keyway in that shank, the groove on the under side of the flange being cut at a point diametrically opposite. The tool shanks may be provided with flanges in which the ledges are formed in the same manner as that illustrated in connection with the sleeves.

In Fig. 7 I have illustrated a modification of the means for separating tools and sleeves, this modification consisting in a rack 36, milled on one side of the shank 37 of the tool 38 and a bearing 39 into which the pin 40 of the pinion wrench 41 may be inserted to bring the teeth of the pinion 42 into engagement with the teeth of the rack 36. The lower end of the sleeve 43 is provided with a receptacle 44, which guides and supports the end of the pinion wrench while in use. It will be apparent to those skilled in the art that by turning the wrench the pinion engages the rack to withdraw the shank 37 from the sleeve 43. In this Fig. 7 I have shown a straight shank tool with a taper key and keyway like that illustrated in Fig. 5, and in this case the pinion wrench may be used to force the tool shank into the sleeve as well as to withdraw it from the sleeve. This means of separating tools and sleeves may be applied to taper shank tools as well as to straight shank tools. As in Fig. 7, a sleeve may be equipped with a receptacle for the pinion wrench for withdrawing the shanks of tools, while it may be equipped also with a flange upon which a groove or grooves are cut for use in connection with a drift pin in separating, as already described.

By the use of any of these forms of the means for separating driving sleeves or bushings, it is possible to separate any two of a series without interfering with the connection between the others. The separation is accomplished by operating directly upon the exposed ends of the sleeves when one is inserted within the other. The advantages of such means for separating devices of this character will be manifest to those skilled in the art.

While I have herein shown and described the preferred embodiment of my invention and certain modifications thereof, it will be apparent to those skilled in the art that many other changes may be made without departing from the spirit of my invention.

What I claim as new and desire to secure by Letters Patent is:—

1. In combination, a series of driving sleeves fitting one within the other, each sleeve having a socket and a shank, keys and key-ways for maintaining said sleeves in alinement, a flange at the socket end of each of said sleeves, and a tangential groove formed in each of said flanges for the reception of a wedge-shaped separating tool.

2. In combination, a driving member in the form of a sleeve, a driven member fitting within said sleeve, means for maintaining said members in alinement, a flange at the outer end of said sleeve, and a flange on said driven member adjacent said first named flange, said flanges being provided with opposed grooves in alinement for co-operation with a wedge-shaped separating tool.

3. In combination, a series of driving sleeves fitting one within the other, the open ends of each of said sleeves being provided with a flange, and means for maintaining said sleeves in alinement, said flanges being provided with tangential grooves registering in pairs, said pairs being disposed alternately on opposite sides of the assembled structure.

In witness whereof, I hereunto subscribe my name this 6th day of August A. D., 1907.

JOHN M. PALMER.

Witnesses:
HARVEY L. HANSON,
FRED W. KOEHN.